Figure 1:
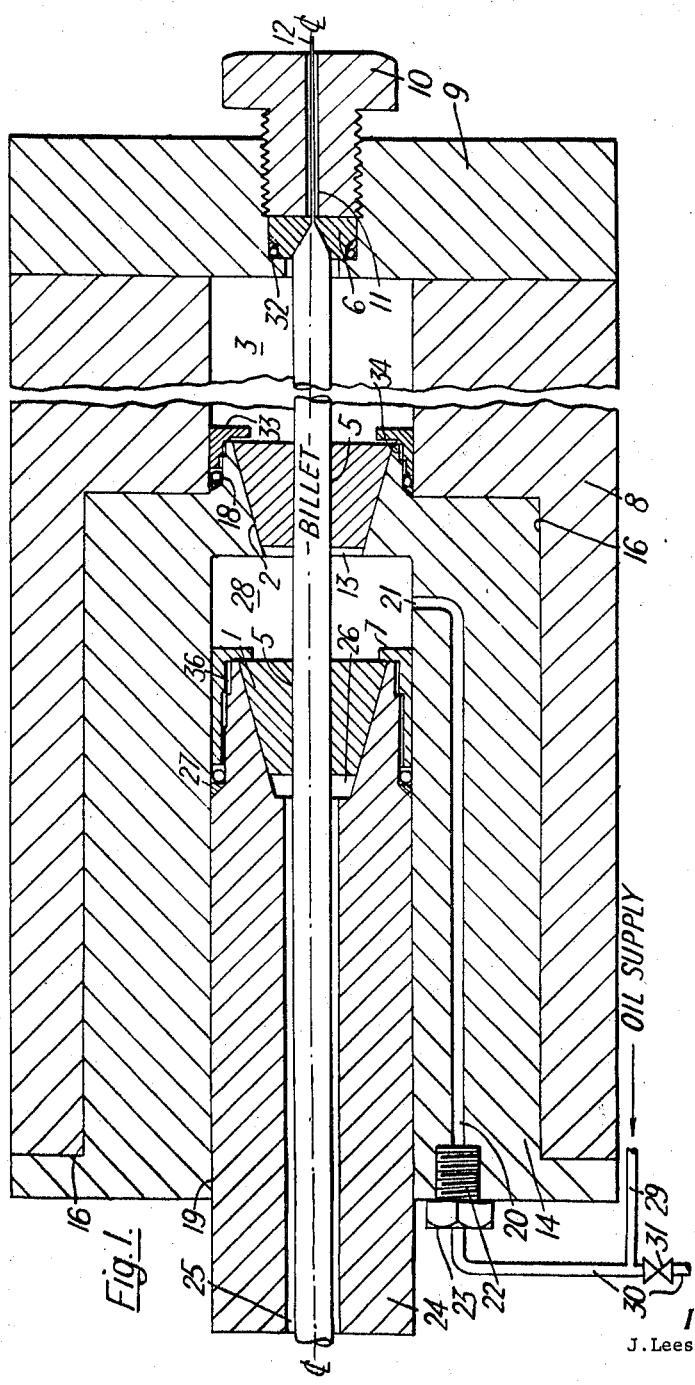

Inventor(s)
J. Lees-D.A. Gunn

United States Patent Office 3,423,983
Patented Jan. 28, 1969

3,423,983
FEED MECHANISM FOR A HYDROSTATIC EXTRUSION SYSTEM
John Lees and Duncan Alexander Gunn, London, England, assignors to International Standard Electrical Corporation, New York, N.Y., a corporation of Delaware
Filed Nov. 29, 1966, Ser. No. 597,663
Claims priority, application Great Britain, Nov. 30, 1965, 50,743/65; Apr. 7, 1966, 15,562/66
U.S. Cl. 72—270                                15 Claims
Int. Cl. B21c 33/00; B21d 24/14

The invention relates to a feed mechanism for a high-pressure hydrostatic extrusion system.

In a hydrostatic extrusion process, the billet to be extruded, which may be either in cylindrical form or coiled or reeled, is completely surrounded by a fluid so that the billet-container friction is virtually eliminated and the pressure to extrude a very long billet will be no different from that required to extrude a short billet. It is thus clear that extremely long billets can be extruded in this way, the only limitation in present systems being the length of the high-pressure chamber to enclose the billet completely.

In view of the fact that the hydrostatic process makes it possible to extrude very long billets, a continuous extrusion process in which the billet or wire is fed continuously into one part of the high-pressure extrusion chamber while it is simultaneously extruded from another is required in order that this process may be made practicable and adaptable for industrial use.

It is an object of the invention to provide apparatus for a continuous extrusion process in which long billets or wires are economically extruded without risk of buckling.

The invention provides a feed mechanism for a high-pressure hydrostatic extrusion system in which the high-pressure chamber is closed by means of a seal unit through which the billet to be extruded passes but is free to move only when the pressure outside said high-pressure chamber, in the immediate vicinity of said seal unit, is at least equal to the pressure within said high-pressure chamber, first means being provided to control said pressure outside said high-pressure chamber, and second means being provided for moving said billet into said high-pressure chamber.

According to one feature of the invention, a feed mechanism as detailed in the preceding paragraph is provided wherein said first means is constituted by an intermediate chamber which is enclosed by said second means, said intermediate chamber being provided with means whereby the pressure therein may be maintained either at a level at least equal to the pressure within said high-pressure chamber or at atmospheric pressure.

According to another feature of the invention, a feed mechanism as described in the preceding paragraphs is provided wherein said second means is a second seal unit located in a retaining member and through which the billet to be extruded passes but is free to move relative to said seal unit only when the pressure within said intermediate chamber is atmospheric, said second seal unit and its retaining member being free to move axially relative to said extruder die and seal unit.

According to a further feature of the invention, a feed mechanism as set forth in the preceding paragraphs is provided, wherein said seal units are conical-shaped and consist of a number of sectors, wherein said sectors have a layer of high-compressibility sealing material interposed at the interfaces between each pair of said sectors.

According to a further feature of the invention, a feed mechanism as in the preceding paragraphs is provided, wherein said seal units have retaining members.

Figure 2:
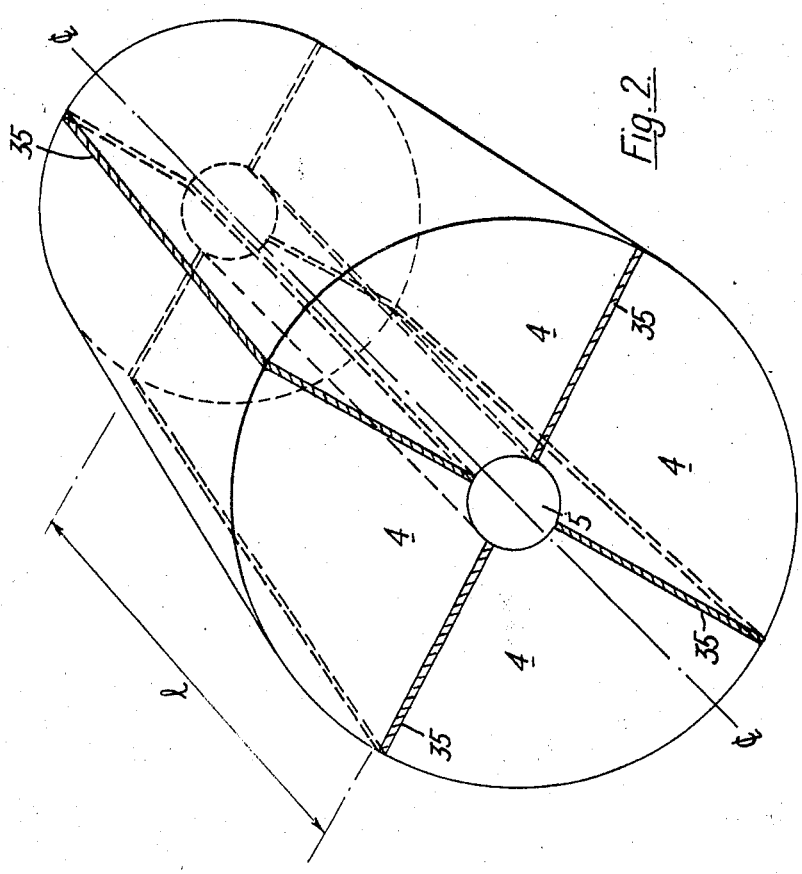

The foregoing and other features according to the invention will be understood from the following description with reference to the accompanying drawings in which:

FIG. 1 shows a feed mechanism for a hydrostatic extrusion system; and
FIG. 2 shows a conical-shaped seal unit used in the feed mechanism shown in FIG. 1.

Referring to FIG. 1, a feed mechanism for a hydrostatic extrusion system is shown and comprises double seal units 1 and 2 for the high-pressure hydrostatic chamber 3 which is provided in the main body 8. This body may be formed, for example, of high-strength alloy steel or cemented carbide. The seals 1 and 2, which may be made, for example, of high-strength alloy steel or cemented carbide, consist of a number of sectors 4, typically 3 to 6, which have tapered back surfaces as shown in FIG. 2. The length $l$ of the sector 4, the cone angle, and the diameter of the central hole 5 in the seals 1 and 2 are determined by the diameter of the billet to be extruded, and the extrusion pressure against which the seals 1 and 2 must retain the billet in operation.

To prevent leakage of the high-pressure fluid past the sectors 4, a layer 35 of high-compressibility sealing material, for example, neoprene rubber, is interposed at the interfaces between each pair of the sectors 4 as shown in FIG. 2. Alternatively, a rubber diaphragm could be used which completely separates the high-pressure fluid from the seal units but at the same time allows freedom of movement for the operating members. The layers 35 also help to facilitate the releasing of the sectors 4 from the billet when the seal units are released.

The high-pressure chamber 3 is closed at one end by the extrusion die 6 mounted in a plate 9 and retained by a plug 10 which has a central hole 11, the diameter of which is slightly larger than the extruded product 12. The oil seal 32 provides the necessary seal for the high-pressure chamber 3. The opposite end of the high-pressure chamber 3 is closed by means of the seal unit 2, which is fitted into a cone-shaped hole 13 in its housing member 14. The housing member 14, for example, of high-strength alloy steel or cemented carbide, fits into the hole 16 and the high-pressure chamber 3 in the main body 8.

That part of the housing member 14 which fits into the high-pressure chamber 3 in the main body 8 is reduced in diameter and provided with a threaded section 34. The reduced section facilitates the fitting of an oil seal assembly 18 which provides the necessary seal for the high-pressure chamber 3, and the threaded section 34 provides the means for fitting a retaining ring 33 which retains both the seal unit 2 and the oil seal assembly 18.

The housing member 14 is also provided with a central flat-bottom hole 19 which is machined such that it breaks into, and is concentric with, the cone-shaped hole 13, its depth thereby determining the length of the cone-shaped hole 13. A further hole 20 is provided in the housing member 14, which is machined parallel to the central hole 19 to a depth such that it breaks through into another hole 21 which is a blind hole that opens out into the inside of, and at a point in close proximity to the bottom of, the hole 19. The hole 20 is provided with a threaded section 22 where it enters the housing member 14, into which is fitted a pipe coupling 23 to facilitate the injection of oil into the central hole 19.

The central hole 19 in the housing member 14 is machined to a high surface finish to facilitate a good sliding fit for the piston 24, for example of high-strength alloy steel. The piston 24 is provided with a central hole 25 through which the billet to be extruded passes, and which is countersunk at one end to form a cone-shaped aperture 26 into which is fitted the seal unit 1. The countersunk end of the piston 24 is also machined to reduce its diameter for a length approximately equivalent to the depth of the cone-shaped aperture 26.

The reduced section which facilitates the fitting of an oil seal assembly 27 is provided with a threaded section 36 to provide the means for fitting a retaining ring 7. The retaining ring 7 retains both the seal unit 1 and the oil seal assembly 27 in operation.

In operation, the billet is passed through the piston 24 and the seal units 1 and 2 into the high-pressure chamber 3. The piston 24 which houses the seal unit 1 defines an intermediate high-pressure chamber 28 between the seal units 1 and 2. The cycle of operation for the unit is as follows: with the piston 24 withdrawn, such that the intermediate chamber 28 is at its maximum volume, the oil pressure within the intermediate chamber 28 is increased by way of the external oil supply system (shown in the drawing), the connecting piping 29 and 30, pipe coupling 23, and holes 20 and 21, to the extrusion pressure. This automatically clamps the seal 1 around the billet and releases the seal unit 2, thereby raising the pressure in the high-pressure chamber 3 to the extrusion pressure. The piston 24, which securely retains the billet by means of the seal unit 1, is moved forward to carry out extrusion, the pressure within the intermediate chamber 28 being maintained at the extrusion pressure by means of the relief valve 31 during the extrusion process.

The oil pressure within the intermediate chamber 28 is now released, thereby automatically releasing the seal unit 1 and clamping the seal unit 2 around the billet to retain it in its partially extruded position. The piston 24 may now be withdrawn to its starting position, the oil pressure within the intermediate chamber 28 again increased to the extrusion pressure, thereby reversing the operation of the seal units 1 and 2 such that the seal unit 1 clamps and retains the billet relative to the piston 24 while the seal unit 2 releases it. The process of extrusion is then carried out as previously described. Subsequent operations to obtain a continuous system can be performed merely by regulating the pressure within the intermediate chamber 28 and adjusting the position of the piston 24.

The system described with reference to FIG. 1 is typical of rod extrusion; for wire extrusion, a continuous extrusion system may be obtained by maintaining a short loop of wire within the high-pressure chamber 3 to accommodate the discontinuous feed.

In this type of extrusion system, there is no need for the double seal units 1 and 2 to be positioned axially relative to the high-pressure chamber 3 and the die 6.

The wire billet to be extruded would be fed through the seal unit 2 into the high-pressure chamber 3 by means of the piston 24 and seal unit 1, when the pressure within the intermediate chamber 28 was at the extrusion pressure, such that the length of billets within the high-pressure chamber 3 is considerably longer than the distance from the die to the seal unit 2; consequently the billet needs to be flexible. During the withdrawal of the piston 24, i.e. when the pressure within the intermediate chamber 28 has been released, a restraining force is applied to the billet by way of the seal unit 2 to prevent it from being extruded backwards through the seal unit 2. With the appropriate hydrostatic pressure within the high-pressure chamber 3, the coiled billet is extruded until only the straight length of billet from the seal to the die remains. At the end of the extrusion cycle, the pressure within the intermediate chamber 28 would be again increased to the extrusion pressure, the piston then being moved forward to provide a further loop section of billet within the high-pressure chamber 3, and the extrusion process repeated after the pressure within the intermediate chamber 28 has been released. This process can therefore be continually repeated to provide continuous extrusion of the required product.

It is to be understood that the foregoing description of specific examples of this invention is made by way of example only and is not to be considered as a limitation of its scope.

What we claim is:

1. A feed mechanism for a high-pressure extrusion system, said mechanism comprising:
    (a) first means defining a first chamber;
    (b) an extrusion die adjacent one end of said first chamber;
    (c) a first seal unit adjacent the other end of said first chamber;
    (d) second means defining a second chamber having a first end adjacent said first seal unit and incorporating said first seal unit into a common wall of said second means between said second chamber and said first chamber, said second means further including a piston reciprocable with respect to said first seal unit;
    (e) a second seal unit at the end of said second chamber opposite said first seal unit and carried by said piston, said first and said second seal units having respective openings therethrough for accommodating material which is to be extruded;
    (f) means for supplying fluid under pressure to said second chamber; and
    (g) means for causing reciprocation of said piston.

2. A feed mechanism in accordance with claim 1 in which said seal units have sectoral components.

3. A feed mechanism in accordance with claim 2 in which adjacent pairs of said sectoral components have resilient material interposed therebetween.

4. A feed mechanism in accordance with claim 3 in which said resilient material is rubber.

5. A feed mechanism in accordance with claim 3 in which said resilient material is neoprene.

6. A feed mechanism in accordance with claim 1 in which said seal units have a generally frusto-conical shape and are sub-divided into sectoral components.

7. A feed mechanism in accordance with claim 1 in which said first and second seal units are so arranged that pressure in said second chamber higher than the pressure in said first chamber causes said first seal unit to release said material and said second seal unit to grip said material.

8. A feed mechanism in accordance with claim 1 in which said first and second seal units are so arranged that pressure in said first chamber higher than pressure in said second chamber causes said first seal unit to grip said material and said second seal unit to release said material.

9. A feed mechanism in accordance with claim 1 in which each of said first and said second seal units grip said material only when said respective seal units are in sealing position.

10. A feed mechanism for a high-pressure extrusion system having a first chamber and a second chamber through which is passed the material to be extruded, said first chamber being closable by means of a first seal unit through which said material passes, said material being free to move only when the pressure in said second chamber is at least equal to the pressure in said first chamber, said mechanism further including means for controlling the pressure in said second chamber and means for moving said material through said second chamber and said first chamber to an extrusion die.

11. A feed mechanism in accordance with claim 10 in which said means for moving said material includes a piston reciprocable in said second chamber and carrying a second seal unit.

12. A feed mechanism in accordance with claim 10, further including a resilient diaphragm between said first seal unit and said first chamber.

13. A feed mechanism in accordance with claim 10, further including a second seal unit, said second seal unit having a resilient diaphragm separating it from said second chamber.

14. A feed mechanism in accordance with claim 10 in which said seal unit is provided with a retaining member to limit its motion.

15. A feed mechanism in accordance with claim 10 in which said seal unit has a central opening which conforms to the size of the material to be extruded.

References Cited

UNITED STATES PATENTS

| | | | |
|---|---|---|---|
| 3,328,998 | 7/1967 | Sabroff et al. | 72—362 |
| 3,354,685 | 11/1967 | Green | 72—253 |

MILTON S. MEHR, *Primary Examiner.*

U.S. Cl. X.R.

72—60